Figure 1:
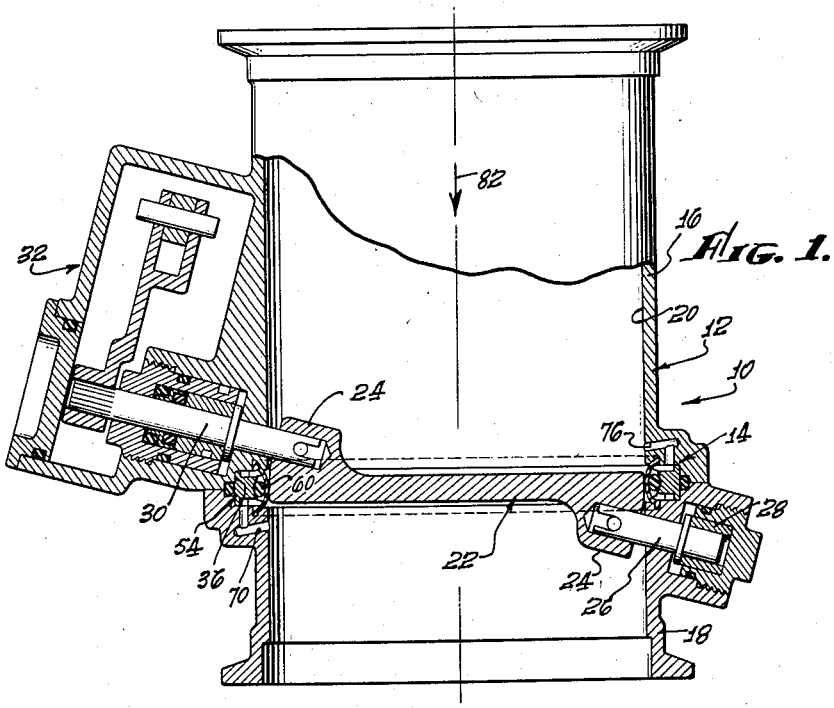

Nov. 3, 1959 W. A. MOORE 2,911,184
PRESSURE LOADED SEAL
Filed Jan. 14, 1957

WILLIAM A. MOORE,
INVENTOR.

By Thomas P. Maloney
ATTORNEY.

United States Patent Office 2,911,184
Patented Nov. 3, 1959

2,911,184

PRESSURE LOADED SEAL

William A. Moore, Pacific Palisades, Calif., assignor to Telecomputing Corporation, Los Angeles, Calif., a corporation of California Application January 14, 1957, Serial No. 633,913

8 Claims. (Cl. 251—173)

This invention relates to a pressure loaded seal for incorporation in valves and for use in conjunction with butterfly-type valve members and the like.

Although the invention is described hereinbelow as utilized in conjunction with a butterfly-type valve member, it is, of course, conceivable that the construction disclosed may be applied with equal cogency to various other types of valve members and it is not intended that the application of the invention be limited to the specific construction shown.

In conventional valves utilizing butterfly valve members and particularly in such valves commonly used in the aircraft industry, a metal-to-metal or metal-to-rubber sealing means is provided. Such sealing means are characterized by inherently high frictional losses which materially increase the power necessary for energizing the valve member and which also, particularly in the case of the metal-to-metal seal, necessitate the manufacture of the valve housing and the valve member itself in conformity with relatively precise tolerances.

It is, therefore, an object of my invention to provide a pressure loaded, dynamic seal for utilization in conjunction with a butterfly valve member which is characterized by the fact that it materially reduces the frictional losses encountered in conventional seal constructions and thus reduces the high torque requirements encountered in conventional valves at the initial opening of the valve member.

Another object of my invention is the provision of a pressure loaded, dynamic seal for use in conjunction with a butterfly valve member which is energizable by pressure differentials created in the flow passage when the butterfly valve member is moved into closed position and which is thus most effectively urged into sealing engagement with the peripheral edge of the butterfly valve member when the maximum need for sealing of the valve member arises. Conversely, when the valve member is rotated to its open position and the pressure differential thereacross is substantially reduced, the sealing pressure exerted by the seal of my invention against the peripheral edge thereof is correspondingly reduced to permit relatively free movement of the valve member and reduce the frictional losses and drag characteristic of prior art constructions.

A further object of my invention is the provision of a dynamic, pressure loaded seal of the aforementioned character which is maintained in optimum alignment with the peripheral edge of the valve member with which it is associated so that optimum linear contact with the peripheral edge of the valve member is maintained at all times during juxtaposition of said peripheral edge to said seal.

It is thus readily apparent that minimal resistance to rotation of the valve member into its closed position and from said closed position to its open position is imposed by the seal and thus the size of the actuator necessary for energizing the valve member can be materially reduced, resulting in an extension of the field of application of valves incorporating the seal of my invention because of the resultant reduction in size and weight of the valve-actuator package.

Since the seal of my invention materially reduces frictional losses tending to impede free movement of the valve member with which it is associated, corresponding reduction in wear on both valve member and seal are obtained, thus materially prolonging the useful life of the valve in which said seal and valve member are incorporated and also resulting in greater efficiency of the valve during its operative life.

Of significance also is the fact that the provision of a dynamic seal of the character of that provided by my invention in conjunction with a butterfly valve member materially reduces the manufacturing costs of the valve because greater dimensional tolerances can be permitted between the peripheral edge of the butterfly valve member and the flow bore in which it is located.

Figure 2:
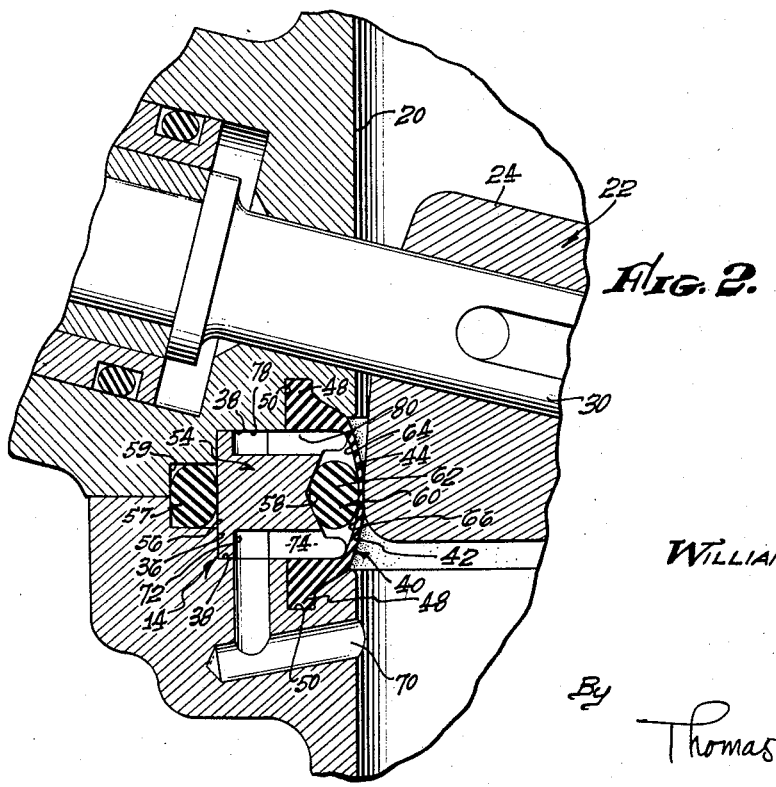

Other objects and advantages of my invention will be apparent from the following specification and the accompanying drawing which is for the purpose of illustration only and in which:

Fig. 1 is a vertical, partly sectional view showing the seal of my invention engaged upon the peripheral edge of a butterfly-type valve member; and Fig. 2 is an enlarged, fragmentary sectional view showing a portion of the seal of my invention.

Referring to the drawing and particularly to Fig. 1 thereof, I show a valve 10 which is incorporated in a housing 12 and which has a dynamic, pressure loaded seal 14 constructed in accordance with the teachings of my invention provided therein.

The housing 12 of the valve 10 is fabricated in two parts, namely: a body 16 and an end cap 18 which are secured in operative relationship with each other by fastening means, not shown. The housing 12, as defined by the body 16 and the end cap 18, provides an elongated fluid passage 20, through which the flow of fluid is controlled by the action of a butterfly-type valve member 22.

The butterfly-type valve member 22 is provided with oppositely directed mounting bosses 24 at its opposite extremities and a supporting pin 26 journaled in a bearing 28 mounted in the end cap 18 is operatively secured to one of the bosses 24. The opposite boss 24 has an actuating and supporting shaft 30 fastened thereto which is rotatable by means of an actuator 32 to cause concomitant rotation of the shaft 30 and the valve member 22. Since the actuator 32 is of conventional construction and does not constitute a part of the invention disclosed herein, no detailed description thereof would appear to be indicated.

An annular seal receiving chamber 36 is formed in the wall of the fluid passage 20, said chamber being of substantially rectangular cross section, as best shown in Fig. 2 of the drawing, and being constituted by symmetrically shaped, mating annular recesses 38 formed in the body 16 and the end cap 18.

A sealing means 40 is located in the chamber 36 and is provided with a sealing portion 42 which is arcuate in transverse cross section, the outer face 44 of which is engageable with the peripheral edge of the butterfly-type valve member 22. The sealing portion 42 is mounted in operative relationship with the chamber 36 by means of laterally extending, integral lugs 48 which are received in correspondingly formed grooves 50 provided in the body 16 and the end cap 18.

The sealing means 40 is, of course, substantially annular in configuration and is preferably formed of a plastic constituted by a tetrafluoroethylene polymer which is characterized by outstanding chemical resistance, excellent heat stability, and low coefficient of friction. Obviously, if the use of tetrafluoroethylene plastic is not convenient, other plastics having analogous properties can be readily utilized in fabricating the sealing means 40.

Located in the annular seal receiving chamber 36 is an annular supporting and partition member 54 formed from aluminum or the like and having a base portion 56 engaged upon a static seal 57 disposed in a groove 59 communicating with the interior of the chamber 36. Provided on the inner edge of the partition and supporting member 54 is a V-shaped receptacle 58, said receptacle being adapted to receive a pressure responsive means 60 which is constituted by an O-ring 62 formed from neoprene or the like.

The partition and supporting member 54, in conjunction with the pressure responsive means 60, thus divides the inner portion of the seal receiving chamber 36 into separate fluid pressure areas 64 and 66, as best shown in Fig. 2 of the drawing. It will be noted that the O-ring 62 engages the inner surface of the sealing portion 42 of the sealing means 40 and urges the outer face 44 of said sealing portion into engagement with the contiguous peripheral edge of the butterfly-type valve member 22. The O-ring 62 is continually maintained in contact with the inner surface of the sealing portion 42 of the sealing means 40 and the receptacle 58 is of V-shaped configuration to insure that the seal between the outer face 44 of the sealing portion 42 of the sealing means 40 and the peripheral edge of the butterfly valve member 22 always occurs at or near the center of the outer face 44 regardless of dimensional variations in the O-ring 62. Thus, optimum linear contact with the peripheral edge of the valve member 22 is maintained at all times and the most desirable sealing characteristics are thus achieved.

Moreover, stability in the location of the outer face 44 of the sealing portion 42 of the sealing means 40 is thus achieved, preventing shifting and deformation of the sealing portion of the sealing means 40.

Formed in the end cap is a port 70 which communicates with the downstream side of the fluid passage 20 at its outer extremity and at its inner extremity communicates with a circular transfer groove 72 of annular configuration formed in the side wall of the partition and supporting member 54. Radial ports 74 are also formed in the side wall of the partition and supporting member 54 and transfer fluid from the transfer groove 72 to the fluid pressure area 66 on the lower side of the O-ring 62, as best shown in Fig. 2 of the drawing. A port 76 is formed in the wall of the fluid passage 20 in the body 16 and has one end in communication with the upstream side of said fluid passage and its opposite extremity in communication with a transfer groove 78 formed in the upper side of the partition and supporting member 54, as viewed in Fig. 2 of the drawing, said transfer groove being maintained in fluid communication with the fluid pressure area 64 on the upper side of the O-ring 62 by means of radial grooves 80.

It is thus readily apparent that the annular seal receiving chamber 36 and, more particularly, the fluid pressure areas 64 and 66 defined therein by the annular partition and supporting member 54 and its associated pressure responsive means 60 and the sealing means 40, is in continual communication with the fluid in the fluid passage 20 by virtue of the ports 70 and 76. When the butterfly-type valve member 22 is disposed in open position, no fluid pressure differential is created across the ports 70 and 76 and thus the fluid pressure in the fluid pressure areas 64 and 66 is the same. The substantially identical fluid pressures on either side of the O-ring 62 tend to center said O-ring in the receptacle 58 constituted by the V-shaped groove in the inner edge of the partition and supporting member 54 and reduce the outward pressure on the sealing portion 42 of the sealing means 40.

Therefore, when the butterfly valve member 22 is initially rotated and the peripheral edge thereof initially engages the arcuate sealing portion 42 and, more particularly, the outer face 44 thereof, minimal frictional drag is encountered. However, as soon as the butterfly-type valve member 22 has moved into closed position, a pressure differential is created across the valve member 22 and across the ports 70 and 76. For instance, with fluid flowing in the direction of the arrow 82 of Fig. 1 of the drawing and the valve member 22 moved into closed position, greater pressure will be exerted through the port 76 on the upstream side of the valve member 22 than on the port 70 on the downstream side of said valve member. Therefore, pressure fluid will flow through the port 76 into the transfer groove 78 and through the radial ports 80 into the pressure area 64 on the upper side of the O-ring 62 causing downward movement of the O-ring 62 and corresponding outward movement thereof because of the V-shaped configuration of the receptacle 58.

Such downward and outward movement of the O-ring 62 results in outward flexing of the arcuate sealing portion 42 of the sealing means 40 urging the outer face 44 thereof into more intimate and effective sealing engagement with the contiguous edge of the butterfly-type valve member 22.

Of significance also is the fact that the inherent low coefficient of friction between the tetrafluoroethylene plastic of which the sealing means 40 is formed and the metal of the valve member 22 results in freer movement of the valve member 22 during its initial closing and opening movement when it effectively engages and disengages the sealing means 40 of the seal 14.

It is obvious that the provision of the O-ring 62 insures continuous support of the sealing portion 42 of the sealing means 40 throughout its entire length and that there are no unbalanced pressure forces acting on the unsupported areas of the sealing means 40. Furthermore, as the O-ring 62 is subjected to fluid pressure in the above described manner, wedging thereof occurs because of the V-shape of the receptacle 58 and the arcuate shape of the inner surface of the sealing portion 42 of the sealing means 40. The resultant wedging effect greatly increases the effect of the fluid pressure exerted on the O-ring 62 so that the sealing force between the outer face 44 of the sealing portion 42 of the sealing means 40 is much greater than the pressure forces on the O-ring 62 and thus creates an extremely effective, positive seal between the sealing portion 42 and the contiguous edge of the valve member 22.

When the valve member 22 is rotated to its open position, the low coefficient of friction between the tetrafluoroethylene sealing means 40 and the metal of the butterfly-type valve member 22 reduces the required opening torque. Since the port 76 is located close to the valve member 22, the consequent pressure reduction as the valve member opens is immediately transmitted to the fluid pressure area 64 which permits consequent return of the O-ring 62 to its unwedged position. This results in release of the sealing portion 42 of the sealing means 40 from its dynamic sealing relationship with the contiguous edge of the valve member 22 and thus causes a further reduction in the required torque exerted upon the actuating shaft 30 by the associated actuator 32.

If flow through the fluid passage 20 is reversed, the pressure fluid flows through the port 70 and the associated transfer groove 72 and ports 74 into the pressure area 66 and causes upward movement of the O-ring 62 to energize the sealing means 40 and accomplish the same wedging action.

I thus provide by my invention a dynamic, pressure loaded seal which materially reduces the initial torque necessary to close or open a valve member associated therewith and which thus reduces the size of the power package which must be supplied to energize the valve member.

I claim as my invention:

1. In a valve, the combination of: a housing having a fluid passage and an annular chamber in the wall of said passage, ports being formed in said housing between said passage and opposite sides of said chamber to apply fluid pressure to the opposite sides of said chamber; a butterfly valve member mounted in said passage for movement into a closed position in which the peripheral edge thereof overlies said chamber; annular sealing means mounted in said chamber for movement into engagement with said edge; an annular partition dividing said chamber centrally thereof to provide separate pressure areas in communication with each of said ports; and pressure responsive means in said chamber engaged with said sealing means and movable by a pressure differential on either side of said partition whereby said sealing means is urged outwardly into sealing relationship with said edge.

2. In a valve, the combination of: a housing having a fluid passage and an annular chamber in the wall of said passage, ports being formed in said housing between said passage and opposite sides of said chamber to apply fluid pressure to the opposite sides of said chamber; a butterfly valve member mounted in said passage for movement into a closed position in which the peripheral edge thereof overlies said chamber and separates said ports from fluid communication with each other; annular sealing means mounted in said chamber for movement into engagement with said edge; an annular partition dividing said chamber centrally thereof to provide separate pressure areas in communication with each of said ports; and pressure responsive means in said chamber engaged with said sealing means and movable by a pressure differential on either side of said partition whereby said sealing means is urged outwardly into sealing relationship with said edge.

3. In a valve, the combination of: a housing having a fluid passage and an annular chamber in the wall of said passage, ports being formed in said housing between said passage and opposite sides of said chamber to apply fluid pressure to the opposite sides of said chamber; a butterfly valve member mounted in said passage for movement into a closed position in which the peripheral edge thereof overlies said chamber; annular sealing means mounted in said chamber for movement into engagement with said edge; an annular partition dividing said chamber centrally thereof to provide separate pressure areas in communication with each of said ports; and pressure responsive means in said chamber engaged with said sealing means and movable by a pressure differential on either side of said partition whereby said sealing means is urged outwardly into sealing relationship with said edge, said partition supporting said pressure responsive means in operative relationship with said sealing means.

4. In a valve, the combination of: a housing having a fluid passage and an annular chamber in the wall of said passage, ports being formed in said housing between said passage and opposite sides of said chamber to apply fluid pressure to the opposite sides of said chamber; a butterfly valve member mounted in said passage for movement into a closed position in which the peripheral edge thereof overlies said chamber and separates said ports from fluid communication with each other; annular sealing means mounted in said chamber for movement into engagement with said edge; an annular partition dividing said chamber centrally thereof to provide separate pressure areas in communication with each of said ports; and pressure responsive means in said chamber engaged with said sealing means and movable by a pressure differential on either side of said partition whereby said sealing means is urged outwardly into sealing relationship with said edge, said partition supporting said pressure responsive means in operative relationship with said sealing means.

5. In a valve, the combination of: a housing having a fluid passage and an annular chamber in the wall of said passage, ports being formed in said housing between said passage and opposite sides of said chamber to apply fluid pressure to the opposite sides of said chamber; a butterfly valve member mounted in said passage for movement into a closed position in which the peripheral edge thereof overlies said chamber and separates said ports from fluid communication with each other; annular sealing means mounted in said chamber for movement into engagement with said edge; a rigid, annular partition mounted in said chamber and dividing it into separate pressure areas; and pressure responsive means mounted on said partition for movement by a pressure differential on either side of said partition to urge said sealing means against said edge of said valve member.

6. In a valve, the combination of: a housing having a fluid passage and an annular chamber in the wall of said passage, ports being formed in said housing between said passage and opposite sides of said chamber to apply fluid pressure to the opposite sides of said chamber; a butterfly valve member mounted in said passage for movement into a closed position in which the peripheral edge thereof overlies said chamber and separates said ports from fluid communication with each other; annular sealing means mounted in said chamber for movement into engagement with said edge; a rigid, annular partition mounted in said chamber and dividing it into separate pressure areas; and pressure responsive O-ring means mounted on said partition for movement by a pressure differential on either side of said partition to urge said sealing means against said edge of said valve member.

7. In a valve, the combination of: a housing having a fluid passage and an annular chamber in the wall of said passage, ports being formed in said housing between said passage and opposite sides of said chamber to apply fluid pressure to the opposite sides of said chamber; a butterfly valve member mounted in said passage for movement into a closed position in which the peripheral edge thereof overlies said chamber and separates said ports from fluid communication with each other; annular sealing means mounted in said chamber for movement into engagement with said edge; a rigid, annular partition mounted in said chamber and dividing it into separate pressure areas, said partition having a receptacle therein adjacent said sealing means; and pressure responsive means mounted in said receptacle for movement by a pressure differential on either side of said partition to urge said sealing means against said edge of said valve member.

8. In a valve, the combination of: a housing having a fluid passage and an annular chamber in the wall of said passage, ports being formed in said housing between said passage and opposite sides of said chamber to apply fluid pressure to the opposite sides of said chamber; a butterfly valve member mounted in said passage for movement into a closed position in which the peripheral edge thereof overlies said chamber and separates said ports from fluid communication with each other; annular sealing means mounted in said chamber for movement into engagement with said edge; a rigid, annular partition mounted in said chamber and dividing it into separate pressure areas, said partition having a receptacle therein adjacent said sealing means; and pressure responsive O-ring means mounted in said receptacle for movement by a pressure differential on either side of said partition to urge said sealing means against said edge of said valve member.

References Cited in the file of this patent

UNITED STATES PATENTS

| | | |
|---|---|---|
| 783,953 | Henry | Feb. 28, 1905 |
| 1,834,870 | Rogers | Dec. 1, 1931 |
| 2,054,369 | Francis | Sept. 15, 1936 |
| 2,109,042 | Bennett | Feb. 22, 1938 |
| 2,603,449 | Overholser | July 15, 1952 |
| 2,673,708 | Danks | Mar. 30, 1954 |

FOREIGN PATENTS

| | | |
|---|---|---|
| 278,311 | Great Britain | Apr. 12, 1928 |
| 458,856 | Germany | Apr. 21, 1928 |
| 534,610 | Great Britain | Mar. 12, 1941 |